United States Patent
Katoh et al.

(10) Patent No.: US 7,986,978 B2
(45) Date of Patent: Jul. 26, 2011

(54) HANDS-FREE APPARATUS

(75) Inventors: Daisuke Katoh, Nukata-gun (JP); Hiroyasu Hamanishi, Takahama (JP)

(73) Assignee: Denso Corporation, Kariya (JP)

( * ) Notice: Subject to any disclaimer, the term of this patent is extended or adjusted under 35 U.S.C. 154(b) by 1040 days.

(21) Appl. No.: 11/879,972

(22) Filed: Jul. 19, 2007

(65) Prior Publication Data

US 2008/0039153 A1 Feb. 14, 2008

(30) Foreign Application Priority Data

Aug. 9, 2006 (JP) ................................. 2006-216794

(51) Int. Cl.
*H04M 1/00* (2006.01)

(52) U.S. Cl. .................. 455/569.1; 455/566; 455/414.1; 455/415; 455/416; 379/88.12; 379/211.02; 379/211.01; 379/67

(58) Field of Classification Search .............. 455/569.1, 455/417, 461, 428, 415; 379/88.12, 211.02, 379/211.01, 67
See application file for complete search history.

(56) References Cited

U.S. PATENT DOCUMENTS

| | | | |
|---|---|---|---|
| 5,363,429 A | 11/1994 | Fujisawa | |
| 6,374,102 B1 * | 4/2002 | Brachman et al. | 455/422.1 |
| 6,547,620 B1 | 4/2003 | Hatamura | |
| 7,133,503 B2 * | 11/2006 | Revisky et al. | 379/88.12 |
| 2006/0148459 A1 * | 7/2006 | Wolfman et al. | 455/415 |
| 2007/0082717 A1 * | 4/2007 | Lee et al. | 455/575.2 |
| 2007/0105548 A1 * | 5/2007 | Mohan et al. | 455/426.1 |
| 2009/0270082 A1 * | 10/2009 | Mottes | 455/417 |

FOREIGN PATENT DOCUMENTS

| | | |
|---|---|---|
| JP | 2-86251 | 7/1990 |
| JP | 2000-13528 | 1/2000 |
| JP | 2000-216861 | 8/2000 |
| JP | 2005-286827 | 10/2005 |
| JP | 2006-211365 | 8/2006 |

OTHER PUBLICATIONS

U.S. Appl. No. 11/093,164, filed Mar. 29, 2005, Suzuki et al.
Office action dated Oct. 20, 2009 in corresponding Japanese application No. 2006-216794.

* cited by examiner

*Primary Examiner* — Kamran Afshar
*Assistant Examiner* — Shahriar Behnamian
(74) *Attorney, Agent, or Firm* — Harness, Dickey & Pierce, PLC

(57) ABSTRACT

A hands-free apparatus determines whether there is an incoming call, and then determines whether the incoming call is to be answered by switching from a current call or to be rejected. When the incoming call is determined to be answered, the current call in a hands-free communication is put on hold for switching to the incoming call, and call partner information of the current call is spared from being displayed on a display unit to represent that the incoming call is now being established.

4 Claims, 3 Drawing Sheets

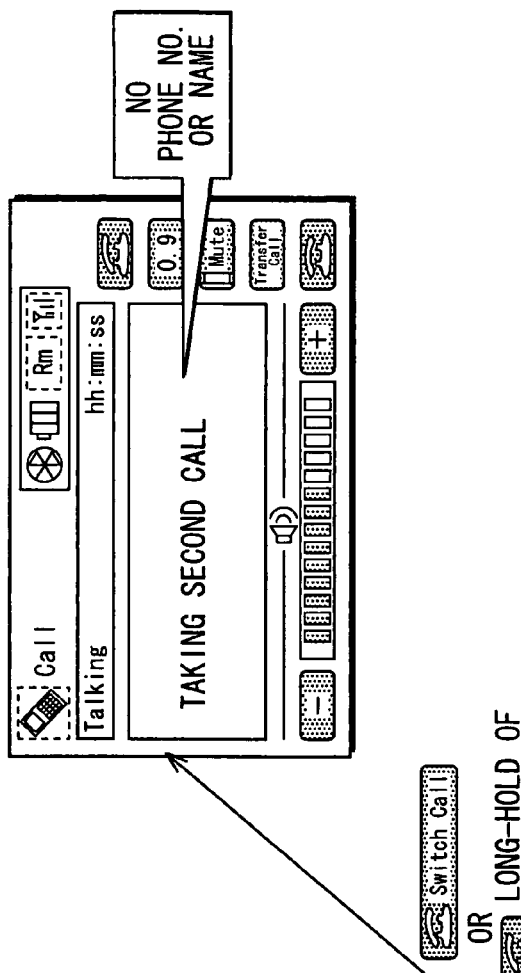
FIG. 3A
FIG. 3B
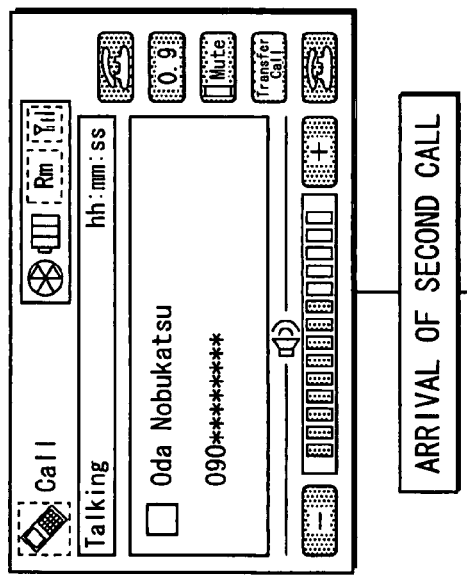
FIG. 3C
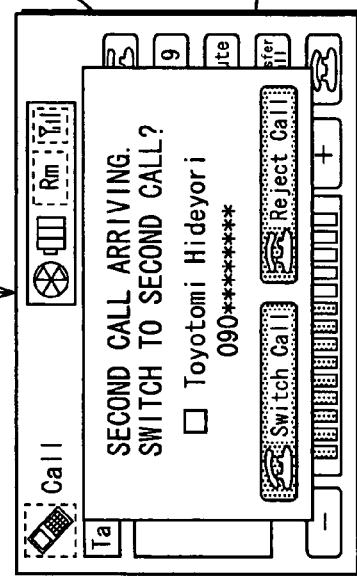
FIG. 3D

HANDS-FREE APPARATUS

CROSS REFERENCE TO RELATED APPLICATION

This application is based on and claims the benefit of priority of Japanese Patent Application No. 2006-216794 filed on Aug. 9, 2006, the disclosure of which is incorporated herein by reference.

FIELD OF THE DISCLOSURE

The present disclosure generally relates to a hands-free apparatus for a vehicle.

BACKGROUND INFORMATION

Conventionally, a hands-free apparatus that communicates with a portable communication device such as a cellular phone or the like for enabling a hands-free call is disclosed in, for example, Japanese patent document JP-A-2005-286827 (This document is published in U.S. under a publication No. US 2007-0281735). A user of the hands-free apparatus can speak to a call partner without picking up the portable communication device through the hands-free apparatus.

When a call from a third person is incoming to an already busy line of a fixed telephone or a cellular phone, the user of the busy line can switch a current call to the incoming call from the third person by holding the current call with Catch-Phone function (Registered trademark in Japan. Equivalent to call-waiting). These telephone terminals switch the telephone number or the name of the call partner displayed on a display unit when the current call is switched to the call from the third person.

However, when the user performs an operation on the display unit of the hands-free apparatus for switching the call partners by using the call-waiting, the cellular phone does not sends call partner information to the hands-free apparatus even after switching the call partners upon having a call partner switching instruction sent from the hands-free apparatus by utilizing the call-waiting, thereby leaving a chance of displaying a false call partner phone number or name after switching the call partners.

SUMMARY OF THE DISCLOSURE

In view of the above and other problems, the present disclosure provides a hands-free apparatus that prevents a false display of call partner after switching calls.

The hands-free apparatus for establishing a hands-free call of a portable communication device through one of a wireless and a wired connection includes an interrupting call determination unit that determines whether an interrupting call is incoming during the hands-free call, an operation determination unit that determines whether a user operation is an indication of a switch of the hands-free call to the interrupting call or an indication of a rejection of a connection request of the interrupting call when the interrupting call is determined to be incoming by the interrupting call determination unit, and a first display control unit that puts the hands-free call on hold to switch to the interrupting call and displays on a display unit that the interrupting call is being established by answering the interrupting call with call partner information of the hands-free call spared from being displayed.

In this manner, when the interrupting call is determined to be switched to, the hands-free call is put on hold to be switched to the interrupting call, and a call condition displayed on the display unit indicates that the interrupting call is being established after turning off call partner information on the display unit, thereby preventing a false display of the call partner that is being put on line after switching between the calls.

BRIEF DESCRIPTION OF THE DRAWINGS

Other objects, features and advantages of the present invention will become more apparent from the following detailed description made with reference to the accompanying drawings, in which:

FIGS. 3A to 3D show illustrations of screens on a display unit of the vehicle hands-free apparatus.

DETAILED DESCRIPTION

Embodiments of the present disclosure are described with reference to the accompanying drawings.

Figure 1:
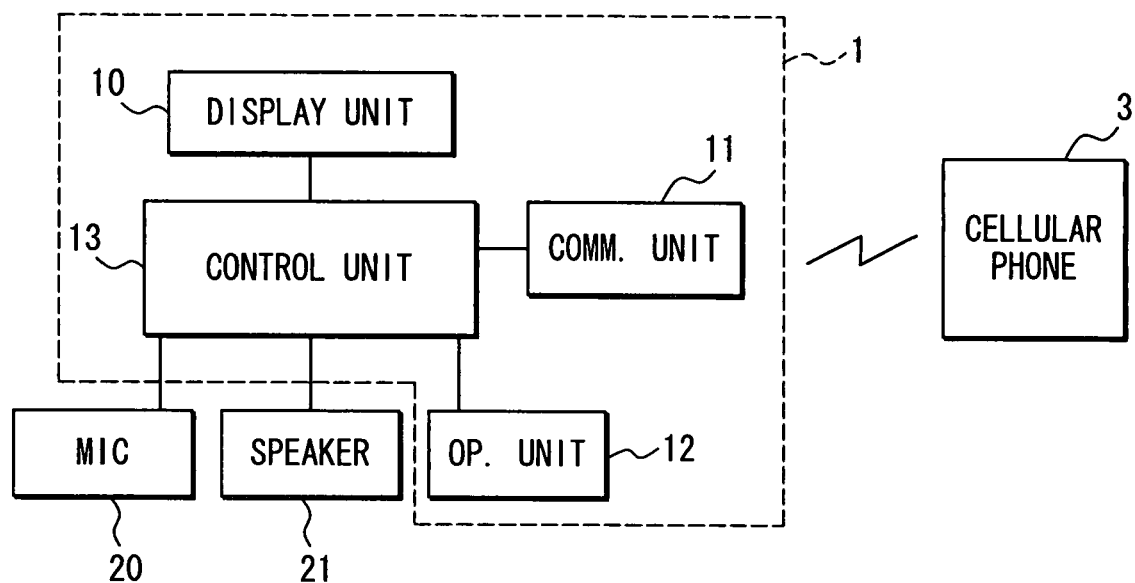
FIG. 1 shows a block diagram of a vehicle hands-free apparatus in an embodiment of the present disclosure.

A construction of a hands-free apparatus for vehicles in an embodiment of the present disclosure is shown in FIG. 1.

A hands-free apparatus 1 for vehicles performs a short distance radio communication with a cellular phone 3 that has Bluetooth communication function (Bluetooth is a registered trademark), and establishes a hands-free call between the handest 3 and a call destination through a base station (not illustrated).

The hands-free apparatus 1 includes a display unit 10, a communication unit 12, an operation unit 12, and a control unit 13.

The display unit 10 has a liquid crystal display unit or the like, and displays an image based on an image signal that is inputted from the control unit 13. The display unit 10 displays various information such as a communication condition, a communication time, a call partner phone number, a call partner name, an off-hook switch for placing a call, an on-hook switch for terminating a call, numeric keys of 0 to 9, a volume control key, a mute key for muting a call voice that is output from a speaker 21, a transfer key for switching between a private mode and a hands-free mode (described later), a charge/radio-wave condition of the cellular phone 3 and the like.

The communication unit 11 exchanges a radio signal of the short distance radio communication with the cellular phone 3 based on an instruction from the control unit 13. More practically, the communication unit 11 has an antenna for receiving a radio signal from the cellular phone 3 (not shown in the figure), performs to the radio signal received thereby a predetermined Bluetooth protocol operation such as an amplification, a frequency conversion, a demodulation, an A/D conversion and the like, and outputs the result of the Bluetooth protocol operation to the control unit 13. In addition, the communication unit 11 performs to data from the control unit the predetermined Bluetooth protocol operation such as an D/A conversion, a modulation, a frequency conversion, an amplification, and the like, and outputs the result of the Bluetooth protocol operation to the antenna for transmission to the cellular phone 3.

The operation unit 12 has touch switches disposed on a screen of the display unit 10, mechanical switches around the screen of the display unit 10, steering switches on a steering wheel of the vehicle for remote control (none of them are shown in the figure) and the like. The operation unit 12 outputs a signal that reflects user's operation of those switches to the control unit 13. In this case, the steering switches includes the off-hook switch for placing the call and the on-hook switch for terminating the call.

The control unit 13 is implemented as a computer that has a CPU, a memory, an input/output (I/O) and the like. The CPU of the computer performs hands-free call operations by executing programs stored in the memory.

The control unit 13 also has a microphone 20 for collecting a voice of occupants in the vehicle and outputting a sound signal to the control unit 13 and a speaker 21 for outputting a sound and/or a voice according to the sound signal from the control unit 13. The microphone 20 and the speaker 21 are disposed in an inside of the vehicle.

The cellular phone 3 operates in a hands-free mode that utilizes the vehicle hands-free apparatus 1 for establishing a call and also operates in a private mode that only utilizes a built-in function of the cellular phone 3 itself for establishing a call. Switching between these modes is instructed by an operation of an operation key on the cellular phone 3, or an operation of the transfer key displayed on the display unit 10 of the hands-free apparatus 1.

Figure 2:
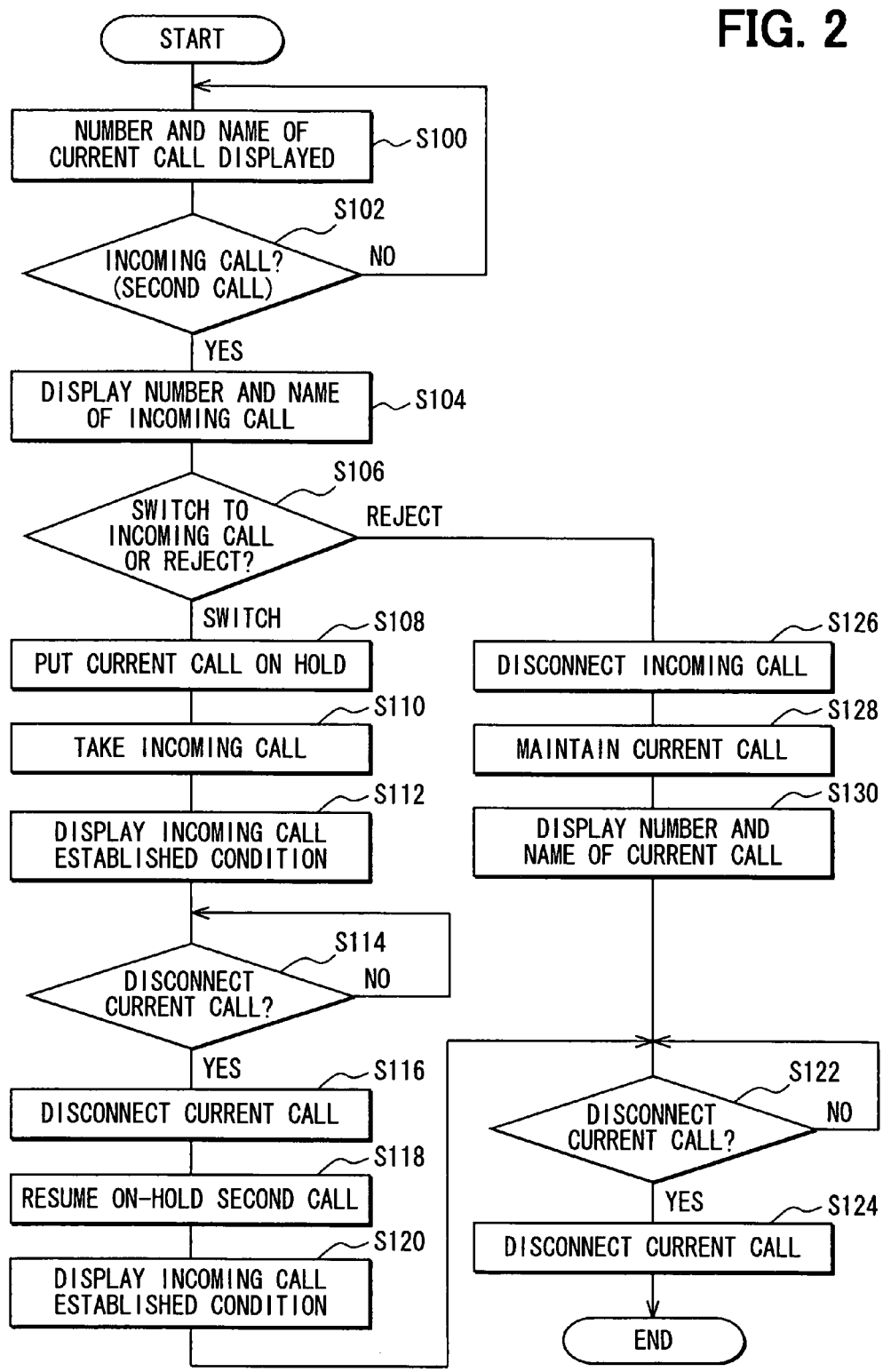
FIG. 2 shows a flowchart of a process in a control unit of the vehicle hands-free apparatus.

A process in the control unit 13 is explained next with reference to FIG. 2. In this case, an assumption of the explanation is that the cellular phone 3 is brought into the inside of a vehicle, and the hands-free apparatus 1 for vehicles is connected to the cellular phone 3 by the short distance radio communication. In addition, it is assumed that the cellular phone 3 is set to a hands-free mode. When the cellular phone 3 and a communications equipment (not illustrated) of a call partner establish a communication to have a busy condition of a communication line, the control unit 13 of hands-free apparatus 1 for vehicles starts a process in FIG. 2.

At first, a phone number of a call partner and a name are displayed during a call (S100). More practically, a screen of the display unit 10 displays a phone number ('090******' in the figure) of a call partner and a name ('Oda Nobukatsu' in the figure) as shown in FIG. 3A**.

Then, it is determined whether there is an arrival of an incoming call (S102). More practically, the arrival of the incoming call is determined based on whether there is the arrival of the second call from the third person during a hands-free call from the cellular phone 3. In this case, a phone number of a partner and a name are included in the second call.

When there is no arrival of the second call during the hands-free call, the process returns to step S100 by determining step S102 as NO.

When there is an arrival of the second call during the hands-free call, the process in step S102 is determined as YES, and displays a phone number of second call and a name (S104). More practically, a pop-up screen for promoting a choice of either of a "Switch Call" switch and a "Reject Call" switch with a message expressing the arrival of the second call as shows in FIG. 3B. In addition, a phone number (090******** in the figure) of the call partner of the second call and a name (Toyotomi Hideyori in the figure) are displayed at the same time.

Then, the process determines whether to take the second call or to reject it (S106). More practically, whether to switch a current call to the second call or to reject a request of connection from the second call is determined. When the "Switch Call" switch is selectively operated by a user or an of-hook switch of a steering switch is pushed and held for a few seconds, the process determines that it indicates taking the second call. When the "Reject Call" switch is selectively operated or an on-hook switch of the steering switch is operated by the user, the process determines that it indicates rejecting the second call.

For example, when the "Switch Call" switch is selectively operated by the user, the determination of S106 is to "take the second call," and put the current call on hold to take the second call to be in a call established state (S108, S110). More practically, a command for putting the current call on hold and establishing the call established state is sent to the cellular phone 3 through a communication unit 11. In this case, information indicative of a call partner is not sent to the cellular phone 3 even when the above command is sent to the cellular phone 3.

Next, with the phone number of the call partner and the name in a non-display state, the screen of the display unit 10 displays that the user is taking the second call (S112). More practically, the screen displays "taking second call" with no phone number or name of the partner as shows in FIG. 3C.

Then, whether to disconnect the current call is determined (S114). More practically, based on an operation of the on-hook switch by the user, whether to disconnect the current call in the connected condition is determined.

When the on-hook switch is not operated, the process in step S114 is determined as NO, and the process in step S114 is repeated.

When the on-hook switch is operated, the process in step S114 is determined as YES, the current call is disconnected for putting the second call in a connected condition (S116, S118).

More practically, a command for disconnecting the connection of the current call to put the second call in a connected condition is sent through the communication unit 11.

Next, with the phone number of the call partner and the name in a non-display state, the screen of the display unit 10 displays that the user is taking the second call (S120). More practically, displaying the screen as illustrated in FIG. 3C is continued.

Then, the process determines whether to disconnect the call in the connected condition (S122). More practically, the disconnection of the current call is determined based on the operation of the on-hook switch by the user.

When the on-hook switch is not operated, the process in step S122 is determined as NO, and the process in step S122 is repeated.

When the on-hook switch is operated, the process in step S122 is determined as YES, and then the current call in the connected condition is disconnected (S124).

More practically, the process concludes itself after displaying the screen of the call terminated condition on the display unit 10.

When the arrival of the second call that has taken place during the current call is answered by the user with an operation of the "Reject Call" switch in a condition as shown in FIG. 3A, the process in step S106 determines that the second call is rejected, and the second call is disconnected (S126). More practically, the command for rejecting the arrival of the second call is sent to the cellular phone 3 through the communication unit 11. In this case, when the above command is sent to the cellular phone 3, the information on the call partner is notified from the cellular phone 3.

In addition, the process maintains the call established condition of the current call (S128), and the phone number of the call partner and the name are displayed on the screen of the display unit 10 (S130).

More practically, as shown in FIG. 3D, with the screen of the display unit 10 displaying the phone number (090******** in the figure) of the call partner and the name (Oda Nobukatsu in the figure), and the process proceeds to step S122. In this case, the screen in FIG. 3D is the same as the screen in FIG. 3A.

As described above, the arrival of the second call during the current call is answered selectively by the user with the operation of the "Reject Call" switch, the current call is maintained and the display of the information on the call partner is continued.

The hands-free apparatus 1 prevents a false display of the call partner because the second call is answered by putting a current call on hold with a display of a message of call interrupted condition and no call partner information when the second call is determined to be answered.

In this case, as information on the second call partner is displayed on the screen of the display unit 10 until the determination of one of the switch to the second call or the rejection of the connection request of the second call after arrival of the second call is recognized, the user can recognize the call partner of the second call.

Further, when the second call is determined to be rejected, the user can recognize the call partner of the maintained call as the hands-free apparatus 1 disconnects the request for connection of the second call to maintain the current hands-free call with the call partner information displayed on the screen of the display unit 10.

In addition, as shown in FIG. 3C, when the process in step S112 displays no call partner information on the screen with the message of the call interrupted condition by the second call before determining the disconnection of the current hands-free call, the current hands-free call is switched to the call on hold by disconnecting the current call with the display of no call partner information on the screen with the message of the call interrupted condition by the second call for continuing the screen in FIG. 3C, thereby making it possible to prevent a false display of the call partner.

Although the present invention has been fully described in connection with the preferred embodiment thereof with reference to the accompanying drawings, it is to be noted that various changes and modifications will become apparent to those skilled in the art.

For example, the hands-free apparatus of the present disclosure may be used in a vehicle as well as in a ship, aircraft or the like.

Further, the hands-free call between the hands-free apparatus and the cellular phone may also be applied to the hands-free call between the hands-free apparatus and other portable communication device other than the cellular phone.

Furthermore, the hands-free call may be established by a wireless connection as well as a wired connection between the cellular phone and the hands-free apparatus.

Furthermore, only one of the name or the phone number of the call partner may be displayed on the screen in steps S100, S104, S130 of the process.

Such changes and modifications are to be understood as being within the scope of the present invention as defined by the appended claims.

What is claimed is:

1. A hands-free apparatus for establishing a hands-free call of a portable communication device through one of a wireless and a wired connection comprising:
    an interrupting call determination unit that determines whether an interrupting call is incoming when a current call is the hands-free call;
    an operation determination unit that displays call partner information of the interrupting call on a display unit and determines whether a user operation is an indication of a switch of the current call to the interrupting call or an indication of a rejection of a connection request of the interrupting call when the interrupting call is determined to be incoming by the interrupting call determination unit; and
    a first display control unit that (a) puts the current call on hold to switch the hands-free call to the interrupting call and (b) displays on the display unit a currently active condition of the interrupting call without displaying the call partner information of the interrupting call once the operation determination unit has determined that the user operation is an indication of the switch of the hands-free call from the current call to the interrupting call.

2. The hands-free apparatus of claim 1 further comprising:
    a second display control unit that displays the call partner information of the interrupting call for a time period that starts at determining that the interrupting call is incoming and ends at the determination by the operation determination unit that the interrupting call is either being switched to or being rejected.

3. The hands-free apparatus of claim 1 further comprising:
    a third display control unit that maintains the current call by rejecting the interrupting call and displays the call partner information of the current call when the operation determination unit determines that the interrupting call is being rejected.

4. The hands-free apparatus of claim 1 further comprising:
    a fourth display control unit that switches the hands-free call from the current call to the interrupting call, the current call being put on hold and displays on the display unit that the interrupting call is being established as the hands-free call by answering the interrupting call with the call partner information of the current call not being displayed when the current call is determined to be rejected after displaying that the interrupting call is being established with the call partner information of the current call not being displayed under control of the first display control unit.

\* \* \* \* \*